United States Patent
Kosak

(10) Patent No.: US 6,648,351 B1
(45) Date of Patent: Nov. 18, 2003

(54) CAST ALUMINUM REAR SUBFRAME CONTROL ARM ARTICULATIONS

(75) Inventor: Werner E. Kosak, Brighton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 138 days.

(21) Appl. No.: 10/006,327

(22) Filed: Oct. 22, 2001

(51) Int. Cl.[7] ............................................. B62D 21/11
(52) U.S. Cl. ..................... 280/124.109; 280/124.135; 280/785
(58) Field of Search .............. 280/124.109, 124.135, 280/124.143, 785

(56) References Cited

U.S. PATENT DOCUMENTS

| | | | |
|---|---|---|---|
| 4,618,163 A | | 10/1986 | Hasler et al. |
| 4,943,092 A | * | 7/1990 | Haraguchi ............ 280/124.109 |
| 4,964,651 A | * | 10/1990 | Kubo ................... 280/124.109 |
| 4,966,384 A | * | 10/1990 | Endo et al. ........... 280/124.109 |
| 4,989,894 A | | 2/1991 | Winsor et al. |
| 4,991,867 A | | 2/1991 | Washizu et al. |
| 5,280,957 A | * | 1/1994 | Hentschel et al. .......... 280/788 |
| 5,507,510 A | | 4/1996 | Kami et al. |
| 5,560,651 A | * | 10/1996 | Kami et al. .................. 280/788 |
| 5,562,308 A | * | 10/1996 | Kamei et al. ................ 280/788 |
| 5,667,602 A | | 9/1997 | Fang et al. |
| 5,741,026 A | | 4/1998 | Bonnville |
| 5,833,026 A | | 11/1998 | Zetterström et al. |
| 5,873,587 A | * | 2/1999 | Kawabe et al. ....... 280/124.135 |
| 5,915,727 A | | 6/1999 | Bonnville |
| 6,109,654 A | * | 8/2000 | Yamamoto et al. ......... 280/784 |
| 6,428,046 B1 | * | 8/2002 | Kocer et al. ................ 280/781 |
| 6,511,096 B1 | * | 1/2003 | Kunert et al. ............... 280/785 |
| 2002/0024192 A1 | * | 2/2002 | Rasidescu et al. .... 280/124.135 |
| 2002/0050694 A1 | * | 5/2002 | Mikasa et al. .......... 280/86.758 |
| 2002/0113394 A1 | * | 8/2002 | Ziech et al. .......... 280/124.109 |

FOREIGN PATENT DOCUMENTS

EP  1 304 280 A2 * 4/2003

\* cited by examiner

*Primary Examiner*—Paul N. Dickson
*Assistant Examiner*—George D Spisich
(74) *Attorney, Agent, or Firm*—MacMillan, Sobanski & Todd, LLC

(57) ABSTRACT

An integrally cast aluminum subframe for a vehicle suspension system has control arm connections that avoid high stress in the connections. Mounting studs may be an integral part of the subframe casting or may be subsequently joined to the subframe. Bushings of the articulations of the control arms are joined to the mounting studs from one side only, so that the flexing of the connection that was present in the prior art clevis connection is avoided. Consequently, the articulation is retained between a head of the mounting bolt and the mounting stud.

20 Claims, 4 Drawing Sheets

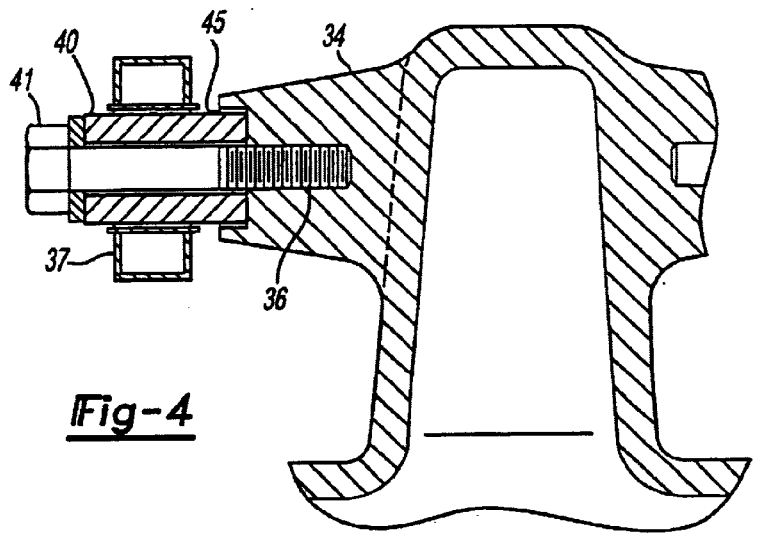
Fig-4
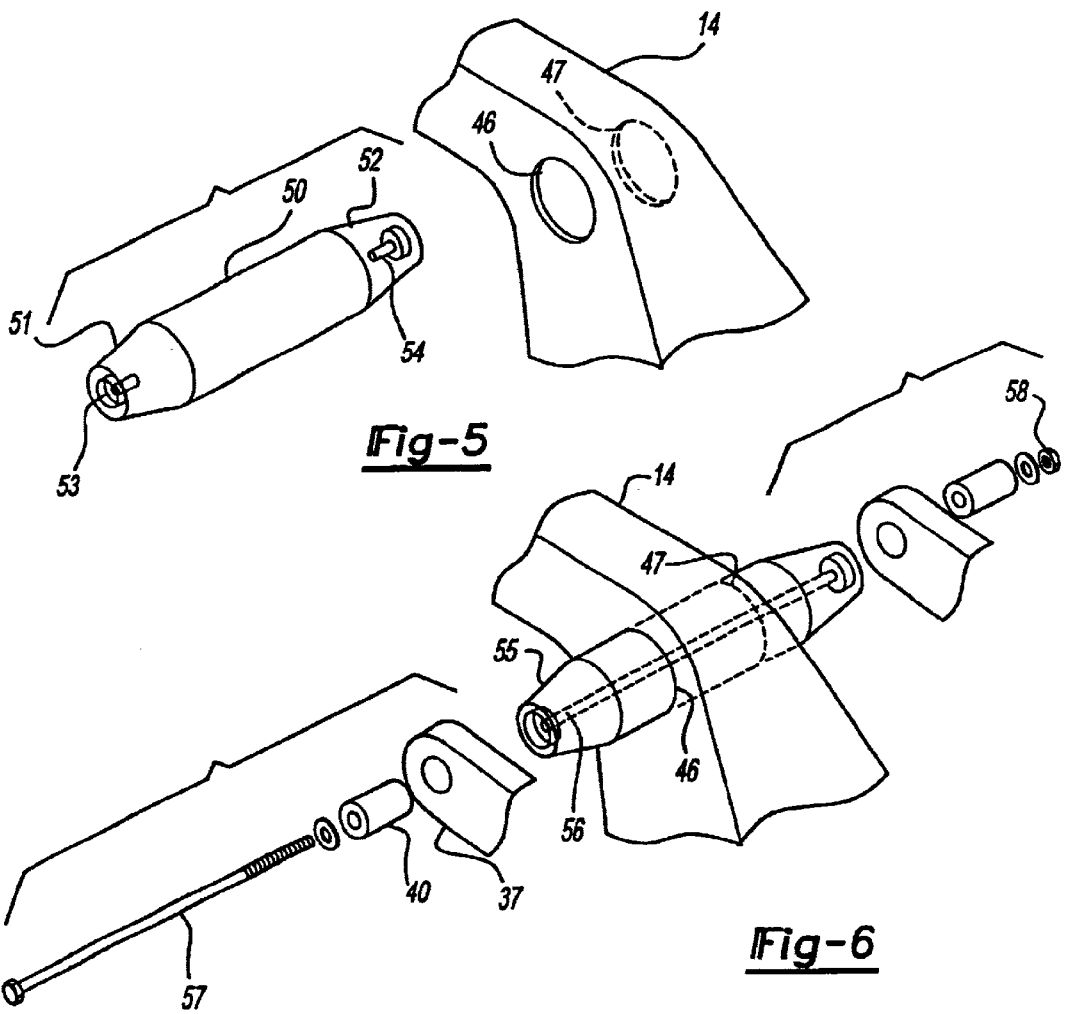
Fig-5
Fig-6 though the many forces to which the frame is subjected, it is important that the frame have high stiffness. The vast majority of vehicle frames have been fabricated from steel because of its high strength, high stiffness, and reasonable cost. However, there are also concerns for minimizing the weight of a frame, based mainly on a desire to improve fuel economy.

CAST ALUMINUM REAR SUBFRAME CONTROL ARM ARTICULATIONS

BACKGROUND OF THE INVENTION

This application is related to co-pending application U.S. serial number, filed concurrently herewith.

The present invention relates in general to a rear subframe for a multi-link vehicle suspension and, more specifically, to the articulating connection of control arms to a cast aluminum subframe.

The vehicle frame supports the vehicle body and, together with other components, such as control arms, springs, and shock absorbers, comprises the suspension system which permits up and down wheel movement without up and down movement of the body. Due to the many forces to which the frame is subjected, it is important that the frame have high stiffness. The vast majority of vehicle frames have been fabricated from steel because of its high strength, high stiffness, and reasonable cost. However, there are also concerns for minimizing the weight of a frame, based mainly on a desire to improve fuel economy.

Integral castings of aluminum or aluminum alloys may be used as vehicle frames or more typically subframes, cradles, and cross members (i.e., frame sections). Aluminum is able to provide good stiffness and can provide a significant reduction in weight. A hollow cross section (e.g., box or tubular) of the subframe members is used to further improve stiffness and reduce weight.

Control arms are swinging levers that provide the links between the subframe and the wheels (or more typically the steering knuckles attached to the wheels). The frame or subframe must provide articulating mounts for the control arms. A common type of control arm is known as the A-arm, in which each arm has two connection points with the subframe and one connection point with the wheel. The subframe articulations typically include a clevis arrangement.

In a clevis, it is necessary to include clearance between the flanges and the control arm bushing to permit insertion of the bushing between the flanges. After tightening of a clevis bolt, the flanges flex toward the bushing to close-off the clearance. In an aluminum casting, however, flexing of the flanges may lead to high stress.

SUMMARY OF THE INVENTION

The present invention has the advantage of providing an integrally cast aluminum subframe with control arm connections that avoid high stress in the connections.

In one aspect, the invention provides a subframe for a vehicle which is adapted to receive articulations (e.g., bushings) of control arms for attaching vehicle wheels. The subframe comprises a substantially hollow left side-rail, a substantially hollow right side-rail, a front cross-member, a rear cross-member, lower control arm connections on the left and right side-rails, a left-side upper control arm connection on one of the cross-members, and a right-side upper control arm connection on the one cross-member. At least one of the upper control arm connections comprises a respective mounting stud, the stud including a bore extending substantially parallel to the side-rails and adapted to secure at least one of the articulations of an upper control arm using a bolt, whereby the articulation is retained between a head of the bolt and the mounting stud.

BRIEF DESCRIPTION OF THE DRAWINGS

FIG. 4 is a side cross-sectional view of a mounting stud and control arm articulation according to one preferred embodiment of the present invention.

FIG. 5 is an exploded, perspective view of an alternate embodiment of the mounting stud.

FIG. 6 is an exploded, perspective view of another alternate embodiment of the mounting stud and articulation for both linkages of a control arm.

DETAILED DESCRIPTION OF PREFERRED EMBODIMENTS

Figure 1:
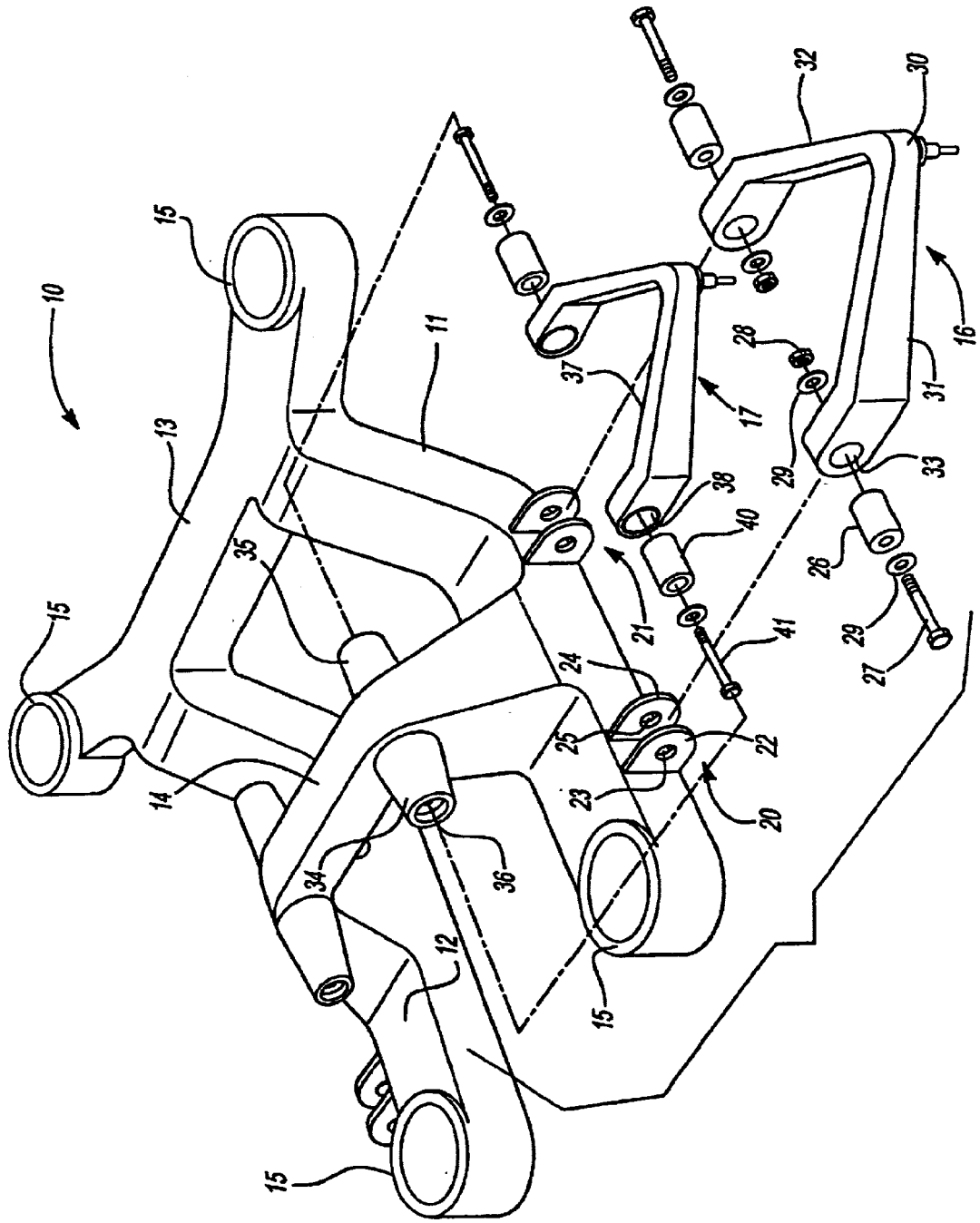
FIG. 1 is a perspective view of a first embodiment of a subframe according to the present invention.

Referring to FIG. 1, a cast aluminum subframe 10 includes a left side-rail 11, right side-rail 12, rear cross-member 13, and front cross-member 14. Bosses 15 located at each corner of subframe 10 provide connection points to the vehicle body and/or to other frame components.

A lower control arm 16 and an upper control arm 17 are pivotably mounted to subframe 10. Lower control arm 16 includes a wheel carrier connection 30 (such as a ball joint) and linkages 31 and 32. Each linkage includes a bearing hole (e.g., bearing hole 33 at the end of linkage 31) for receiving a bushing (e.g., bushing 26). Lower control arm 16 is mounted to left side-rail 11 by conventional clevis connections 20 and 21. Clevis 20, for example, forms an articulation comprising flange 22 with bolt-hole 23, flange 24 with bolt-hole 25, bushing 26, linkage 31, a bolt 27, a nut 28, and washers 29.

Figure 2:
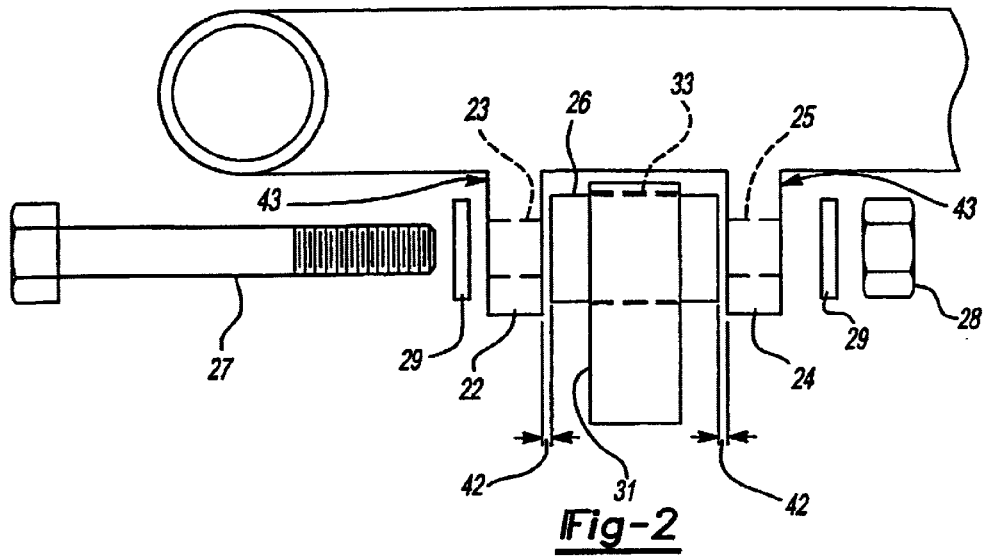
FIG. 2 is a top view of a prior art clevis connection.

Turning briefly to FIG. 2, a top view of clevis connection 20 is shown with bushing 26 aligned for insertion of bolt 27. In order to bushing 26 to be able to fit between flanges 22 and 24, a clearance 42 is provided such that the distance between flanges 22 and 24 is greater than the axial length of bushing 26. The amount of clearance 42 may typically be about 0.5 to 2 mils. In order to securely retain bushing 26 and to apply sufficient torque to nut 28, clearance 42 is removed by flexing of flanges 22 and 24 after installation. For an aluminum casting, this creates stress in stressed regions 43, thus creating a potential site for cracking and failure depending upon the material specification, the flange thickness, and the amount of flexing. Thickening of the flanges adds cost and weight to the casting.

Returning to FIG. 1, the invention employs an improved mounting arrangement for upper control arm 17. A mounting stud 34 and a mounting stud 35 are integrally formed in the casting of subframe 10 and preferably project coaxially in a fore and aft direction from opposite sides of front cross-member 14. Studs 34 and 35 include central bolt-holes, such as bolt-hole 36, and form articulations for the linkages of upper control arm 17. Thus, upper control arm 17 includes a linkage 37 having a bearing hole 38 that receives a bushing 40. A bolt 41 passes through bushing and into bolt-hole 36 for securing linkage 37. Bolt-hole 36 may contain internal threads for engaging bolt 41.

The other linkage of upper control arm 17 is joined to mounting stud 35 in an identical manner. Each bushing of the upper control arm is retained between the bolt heads and the mounting studs. Thus, there is no flexing of any part of the mounting stud and no stresses caused by installation of the control arm. Furthermore, with a mounting stud on each side of front cross-member 14, loads are more evenly distributed within the subframe.

Figure 3:
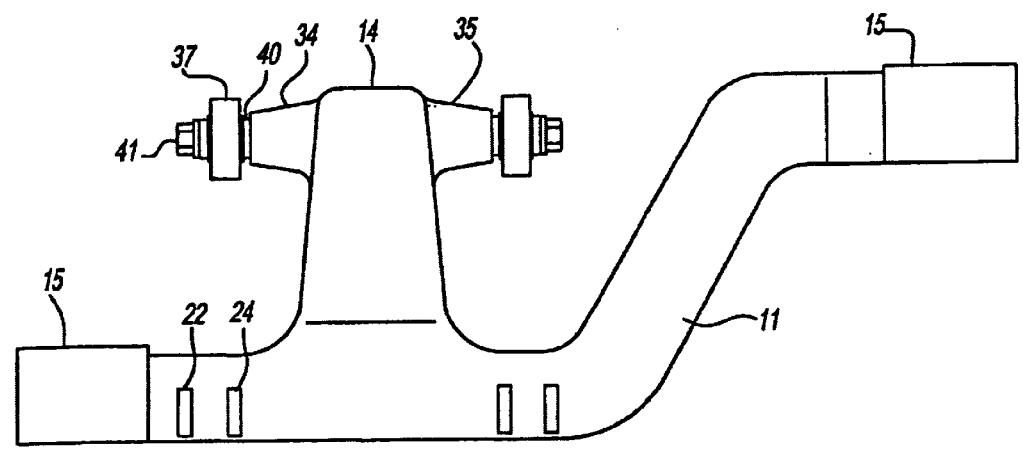
FIG. 3 is a side view of the subframe of FIG. 1.

FIG. 3 is a side view with only the outlines of the control arm linkages at the articulations being shown.

FIG. 4 is a side cross-section showing one of the articulations of FIG. 3 in greater detail. In particular, bolt-hole 36 is shown threaded for receiving the threaded shank of bolt 41. In addition, mounting stud 34 may include a recess 45 for receiving one end of bushing 40. This increases the area against which the forces of the control arm can react, and reduces the loads applied against the bolt. The hollow cross section of cross-member 14 can also be seen in FIG. 4.

An alternative embodiment in which the mounting studs are comprised of a separately formed component rather than cast integrally with the subframe is shown in FIG. 5. Hollow cross-member 14 includes aligned (i.e., coaxial) apertures 46 and 47 for receiving a tubular stud 50. Stud 50 can be press-fit, welded, or secured in any suitable way in apertures 46 and 47. Stud 50 may preferably include at least one tapered end 51 or 52 to facilitate insertion into apertures 46 and 47. Bolt-holes 53 and 54 are substantially identical to the bolt-holes of FIG. 4, for example.

Tubular stud 50 is preferably fabricated from aluminum or aluminum alloy of the same type as that used to form the remained of the subframe, but could be made from other material such as steel depending upon the method of attachment.

FIG. 6 shows an alternative embodiment similar to FIG. 5 except that a tubular stud 55 has an end-to-end through bore 56. Thus, a single bolt 57 and nut 58 secures both articulations simultaneously.

Figure 7:
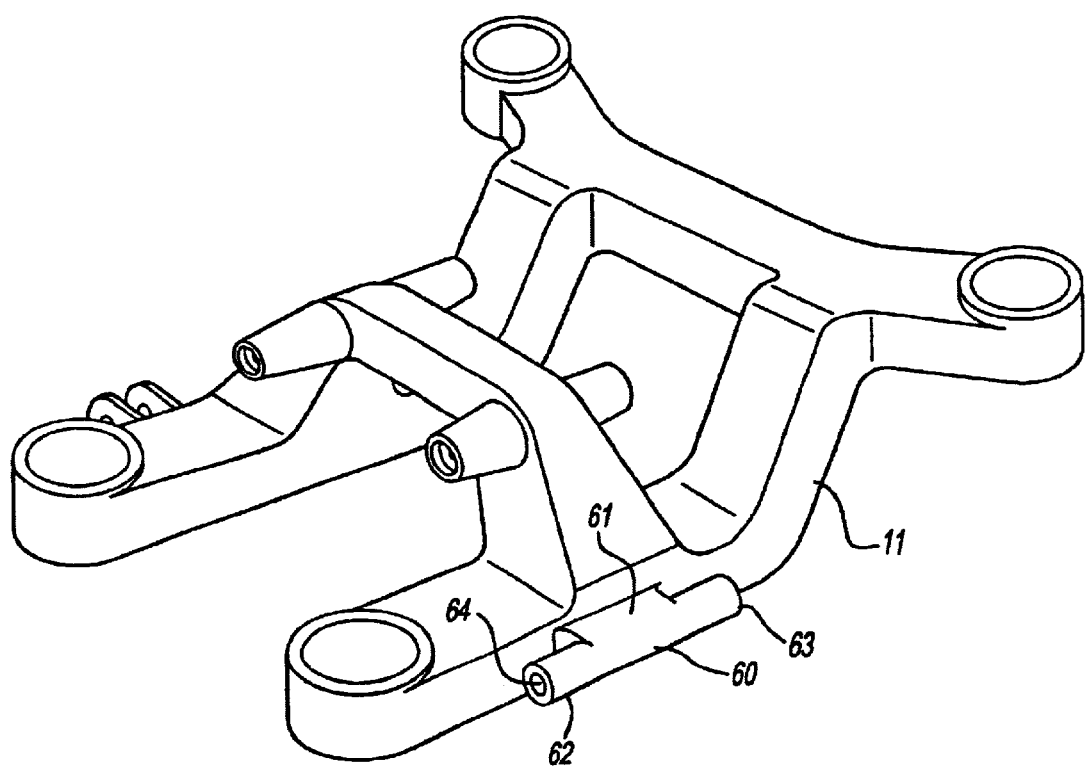
FIG. 7 is a perspective view of another preferred embodiment of the subframe of the present invention employing mounting studs for connecting both the upper and lower control arms.

FIG. 7 shows an alternative embodiment of the subframe of the present invention that takes advantage of the improved control arm attachment for both the upper and lower control arms. Specifically, a lower mounting bar 60 extends from a pedestal 61 and is substantially parallel to the side-rails. Stud ends 62 and 63 have a length adapted to receive the articulations of a lower control arm in the manner previously shown for the upper control arm. A bore 64 may be threaded or may extend all the way through mounting bar 60 according to any of the previous embodiments. Alternatively, mounting bar 60 could instead be comprised of separate mounting studs or could be attached to side-rail 11 by other means within the skill of the art, such as by bolting or welding. Mounting bar 60 would preferably also include recesses for receiving bushings in the manner shown in FIG. 4.

In view of the foregoing description, a cast aluminum subframe has been shown with improved connection of control arm articulations. Thus, the subframe achieves the advantages of low weight, high stiffness, and high strength and reliability of the control arm attachment. Although A-arm control arms have been shown and discussed herein, one skilled in the art will recognize that separate linkages could be used for either or both of the upper and lower control arms within the scope of the present invention.

What is claimed is:

1. A subframe for a vehicle, said subframe adapted to receive articulations of control arms for attaching vehicle wheels, said subframe comprising:
   a substantially hollow left side-rail;
   a substantially hollow right side-rail;
   a front cross-member;
   a rear cross-member;
   lower control arm connections on said left and right side-rails;
   a left-side upper control arm connection on one of said cross-members; and
   a right-side upper control arm connection on said one cross-member;
   at least one of said upper control arm connections comprising a respective mounting stud, said stud including a bore extending substantially parallel to said side-rails and adapted to secure at least one of said articulations of an upper control arm using a bolt, whereby said articulation is retained between a head of said bolt and said mounting stud.

2. The subframe of claim 1 wherein said side-rails, said cross-members, and said mounting stud are integrally cast of aluminum.

3. The subframe of claim 1 wherein said side-rails and said cross-members are integrally cast of aluminum, and wherein said mounting stud is comprised of a substantially tubular stud mounted to a respective cross-member.

4. The subframe of claim 3 wherein said respective cross-member includes a respective aperture for receiving said tubular stud.

5. The subframe of claim 1 wherein said bore is threaded.

6. The subframe of claim 1 wherein said mounting stud further comprises a recess for receiving a bushing of said articulations.

7. The subframe of claim 1 comprising two coaxial mounting studs having a combined length corresponding to a distance between two articulations of an upper control arm and wherein each of said mounting studs secures a respective articulation of said upper control arm.

8. The subframe of claim 7 wherein said bore extends through said coaxial mounting studs from end to end and is adapted to receive a bolt therethrough for securing both of said articulations.

9. The subframe of claim 7 wherein one of said mounting studs is on a forward side of said one cross-member and the other one of said mounting studs is on a rearward side of said one cross-member.

10. The subframe of claim 1 wherein each of said lower control arm connections comprises a respective mounting stud, each stud including a bore extending substantially parallel to said side-rails and adapted to secure at least one of said articulations of a lower control arm using a bolt, whereby said articulation is retained between a head of said bolt and said mounting stud.

11. A vehicle suspension system comprising:
    an upper control arm including a pair of articulations;
    a lower control arm including a pair of articulations; and
    a subframe including a substantially hollow left side-rail, a substantially hollow right side-rail, a front cross-member, a rear cross-member, lower control arm connections on said left and right side-rails, a left-side upper control arm connection on one of said cross-members, and a right-side upper control arm connection on said one cross-member;
    each of said upper control arm connections comprising a respective mounting stud, each stud including a bore extending substantially parallel to said side-rails and adapted to secure at least one of said articulations of an upper control arm using a bolt, whereby said articulation is retained between a head of said bolt and said mounting stud.

12. The suspension system of claim 11 wherein said side-rails, said cross-members, and said mounting studs are integrally cast of aluminum.

13. The suspension system of claim 11 wherein said side-rails and said cross-members are integrally cast of aluminum, and wherein said mounting studs are each comprised of a substantially tubular stud mounted to a respective cross-member.

14. The suspension system of claim 13 wherein said cross-members include respective apertures for receiving said tubular studs.

15. The suspension system of claim 11 wherein said bores are threaded.

16. The suspension system of claim 11 wherein said mounting studs each further comprise a recess for receiving a bushing of said articulations.

17. The suspension system of claim 11 comprising two coaxial mounting studs having a length corresponding to a distance between two articulations of an upper control arm and wherein each one of said mounting studs secures a respective articulation of said upper control arm.

18. The suspension system of claim 17 wherein one of said coaxial mounting studs is on a forward side of said one cross-member and the other one of said mounting studs is on a rearward side of said one cross-member.

19. The suspension system of claim 17 wherein said bore extends through said coaxial mounting studs from end to end and is adapted to receive a bolt therethrough for securing both of said articulations.

20. The suspension system of claim 11 wherein each of said lower control arm connections comprises a respective mounting stud, each stud including a bore extending substantially parallel to said side-rails and adapted to secure at least one of said articulations of a lower control arm using a bolt, whereby said articulation is retained between a head of said bolt and said mounting stud.

* * * * *